US009197552B1

(12) United States Patent
Edsall et al.

(10) Patent No.: US 9,197,552 B1
(45) Date of Patent: Nov. 24, 2015

(54) INDEXED ACCESS TO A FORWARDING TABLE IN A NETWORK DEVICE

(71) Applicant: Cisco Technology, Inc., San Jose, CA (US)

(72) Inventors: Thomas J. Edsall, Los Gatos, CA (US); Alessandro Fulli, San Jose, CA (US); Putu Harry Subagio, Cupertino, CA (US); Chih-Tsung Huang, Burlingame, CA (US)

(73) Assignee: Cisco Technology, Inc., San Jose, CA (US)

( * ) Notice: Subject to any disclaimer, the term of this patent is extended or adjusted under 35 U.S.C. 154(b) by 150 days.

(21) Appl. No.: 13/767,091

(22) Filed: Feb. 14, 2013

Related U.S. Application Data

(60) Provisional application No. 61/713,698, filed on Oct. 15, 2012.

(51) Int. Cl.
*H04L 12/741* (2013.01)

(52) U.S. Cl.
CPC .................................... *H04L 45/54* (2013.01)

(58) Field of Classification Search
USPC ......... 370/396, 254, 357, 352, 356, 353, 389, 370/392, 401, 434, 442; 709/217, 220, 225
See application file for complete search history.

(56) References Cited

U.S. PATENT DOCUMENTS

| 7,343,423 | B2 | 3/2008 | Goguen et al. | |
|---|---|---|---|---|
| 7,525,973 | B1* | 4/2009 | McRae | 370/396 |
| 8,199,764 | B2 | 6/2012 | Hoffman et al. | |
| 2005/0190779 | A1 | 9/2005 | Hoffman et al. | |
| 2006/0280192 | A1* | 12/2006 | Desanti | 370/409 |
| 2008/0084881 | A1* | 4/2008 | Dharwadkar et al. | 370/392 |
| 2013/0243008 | A1* | 9/2013 | Singla et al. | 370/422 |

* cited by examiner

*Primary Examiner* — Awet Haile
(74) *Attorney, Agent, or Firm* — Edell, Shapiro & Finnan, LLC

(57) ABSTRACT

A packet is received at an ingress port of a network device. Based on forwarding information in the packet, an adjacency point is generated using a forwarding information database. If the packet is a routed packet, the adjacency pointer is used as an index to an entry in a media access control (MAC) table that identifies an egress port for the packet. If the packet is not a routed packet, a search is performed in the MAC table to locate an entry in the MAC table that identifies an egress port for the packet.

24 Claims, 9 Drawing Sheets

INDEXED ACCESS TO A FORWARDING TABLE IN A NETWORK DEVICE

CROSS-REFERENCE TO RELATED APPLICATIONS

This application claims the benefit of U.S. Provisional Patent Application No. 61/713,698 filed on Oct. 15, 2012. The content of this provisional application is hereby incorporated by reference herein.

TECHNICAL FIELD

The present disclosure relates generally to forwarding operations of a network device.

BACKGROUND

In computing networks, data is transmitted from a source to a destination in the form of packets. These packets generally pass through one or more network devices, such as switches, routers, firewalls, etc. Certain customers, such as those in the financial sector, demand network architectures that provide low latency and high integration with low costs. The latency of a network device is the difference between the arrival time and the departure time of a packet. As such, latency may be measured as the time between the time that a first bit of a packet (i.e., the packet head) arrives at an ingress port and the time that the first bit of the packet departs from an egress port.

Network devices may perform one or more operations that introduce latency into the packet transmission process. These operations may include, for example, Layer 2 (L2) and/or Layer 3 (L3) forwarding, Network Address Translation (NAT), and L2/L3/Layer 4 (L4) access control list (ACLs) operations, etc.

DESCRIPTION OF EXAMPLE EMBODIMENTS

Overview

Figure 1:
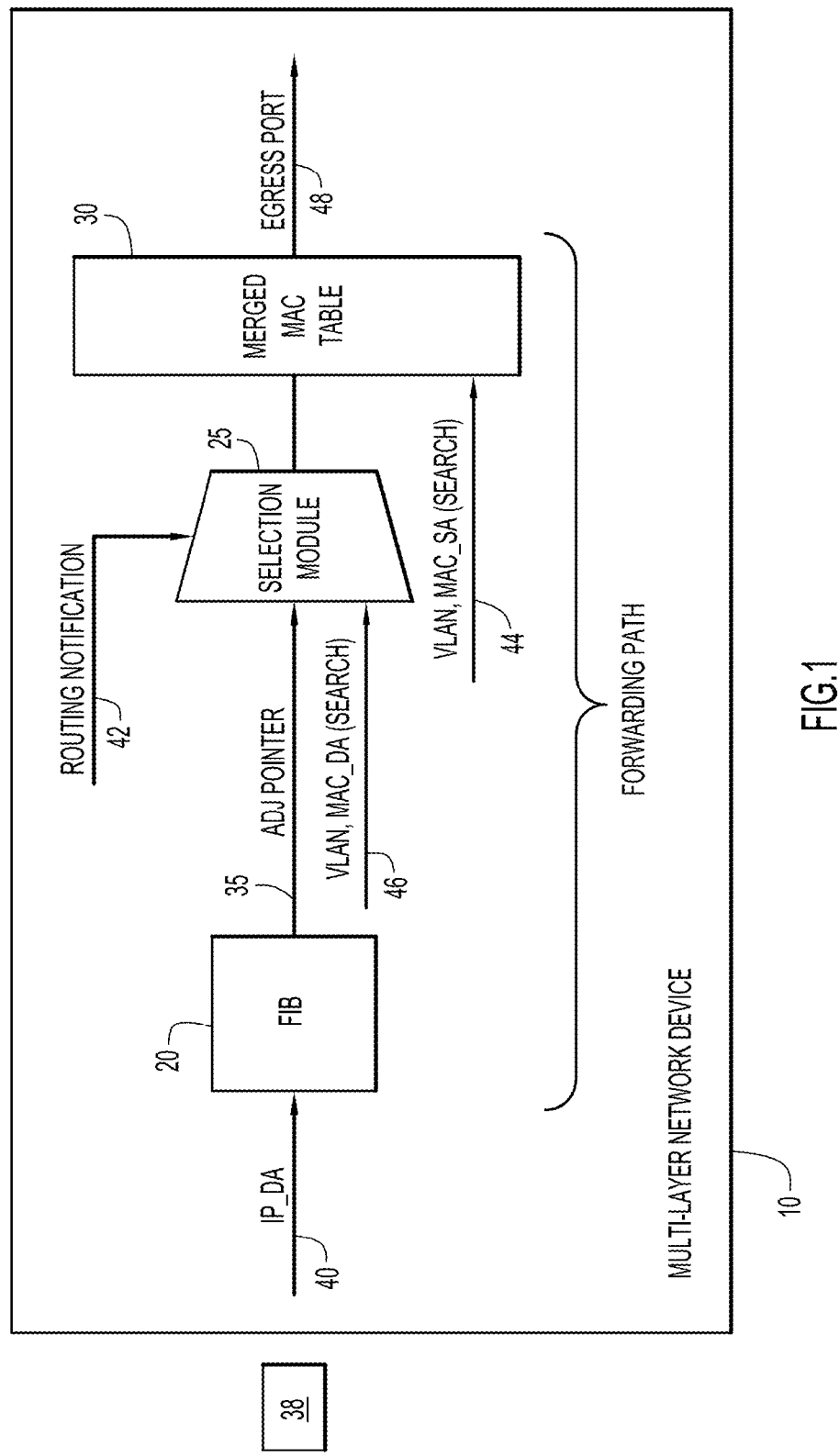
FIG. 1 is a block diagram of a network device configured to operate in accordance with examples presented herein.

A packet is received at an ingress port of a network device. Based on forwarding information in the packet, an adjacency point is generated using a forwarding information database (FIB). If the packet is a routed packet, the adjacency pointer is used as an index to an entry in a MAC table that identifies an egress port for the packet. If the packet is not a routed packet, a search is performed in the MAC table to locate an entry in the MAC table that identifies an egress port for the packet.

Example Embodiments

Packets are received at an ingress port of a network device and forwarded to an egress port for subsequent transmission. The packet forwarding process may include, for example, routing or bridging. Routing refers to the forwarding of a packet between separate and independent sub-networks (subnets) which have non-overlapping ranges of Internet Protocol (IP) addresses. As such, a packet that undergoes routing to pass between subnets having non-overlapping ranges of IP addresses is referred to herein as a routed packet.

By contrast, bridging refers to a process in which a packet is forwarded between separate physical networks which are all carrying the same ranges of IP addresses. As such, a packet that undergoes bridging to pass between networks that are all carrying the same ranges of IP addresses is referred to herein as a bridged or non-routed packet.

In conventional arrangements, a packet forwarding process involves a Layer 2 (L2) lookup in a MAC address table, then an IP address L3 lookup in a FIB. The L3 lookup returns a pointer to an adjacency table that contains an egress Virtual Local Area Network (VLAN) and MAC Address information for the packet that is used for another lookup in an L2 table (MAC table) to locate an egress port. That is, membership in a VLAN may be based on the MAC address of an end device/entity. As such, each MAC address is associated with (i.e., belongs to) a VLAN and a network device will monitor which MAC addresses belong to which VLAN. A VLAN and associated MAC address are collectively referred to herein as a VLAN,MAC address pair.

As such, a conventional multilayer network device (e.g., a L2/L3/layer 4 (L4) switch) includes separate adjacency and MAC tables and is configured to perform an L2 lookup, followed by an L3 lookup, followed by another L2 lookup. These three lookups are performed in a serial fashion in separate forwarding tables. The first L2 lookup determines, along with other conditions, if a packet needs to be routed. The L3 lookup includes searching the destination IP address in the FIB to obtain a pointer to the adjacency table. This adjacency table contains a combination of the router egress interface (typically the egress VLAN) and the next segment (hop) MAC address. Once this VLAN,MAC address pair is retrieved from the adjacency table, this information is used to perform the second L2 lookup, which includes a search of the MAC (L2) table. The result of this search determines the egress port for the packet. As such, conventional arrangements use: (1) an L2 lookup to determine if a packet is routed, (2) an FIB lookup to obtain an adjacency pointer, (3) access to an adjacency table to obtain the VLAN,MAC address pair, and (4) a MAC table lookup. In these arrangements, the VLAN,MAC address information is present both in the adjacency table and the MAC table (i.e., the VLAN,MAC address information is duplicated).

In the conventional arrangement described above, the adjacency table is a lookup table managed by L3 processes, populated by software based on, for example, Address Resolution Protocol (ARP) messages. The MAC table is an L2 table used to search content and is often implemented with a set of hardware controlled hash tables. The separation between the two tables simplifies management as the tables each correspond to different layers (i.e., the adjacency table is L3 and the MAC table is L2). In general, the separation between the adjacency and MAC tables offers a natural separation between L3 and L2 processes, which may be valuable when considering that, due to the nature of Ethernet, the MAC table can be mostly hardware managed with fast and efficient learning and aging of entries.

In accordance with examples presented herein, the adjacency and MAC tables are merged/consolidated so as to reduce latency in the forwarding decision path and to remove redundancies. In accordance with the examples presented herein, the merged table is referred to as a merged MAC table that remains under hardware control while still enabling adjacency management for the L3 applications/processes.

FIG. 1 is a high level block diagram of a multilayer network device 10 in accordance with examples presented herein. As shown, the network device 10 has a forwarding path 15 that includes a FIB 20, a selection module 25, and a merged MAC table 30. The FIB 20 is often implemented with a Ternary Content Addressable Memory (TCAM). The merged MAC table 30 may be implemented with multiple hashes each with multiple associativity. The position of a specific VLAN,MAC address pair depends on the result of the hash and the occupancy of the table at a specific moment.

In operation, a packet 38 may be received at an ingress port (not shown in FIG. 1) of network device 10. The network device 10 is configured to forward the packet 38 along forwarding path 15 to an egress port (also not in shown in FIG. 1) of network device 10. The merged MAC table 30 is used in several different ways within the forwarding path 15. First, the merged MAC table 30 may be used to learn the association of a VLAN and the source MAC address (MAC_SA). In other words, the VLAN, source MAC address are hardware learned at a location in the merged MAC table 30. This operation is represented in FIG. 1 by arrow 44.

Learning the entry in the merged MAC table 30 does not use software inspection of the packet. In the case of a multi-layer switch, the routing process will receive the full packet and the L3 software manager will associate the specific IP address with the VLAN,MAC address pair. The L3 process needs to know the location of the VLAN,MAC address pair in the merged MAC table 30 to create the link between the host IP address in the FIB 20 and the corresponding adjacency (VLAN, MAC address). In certain circumstances, L2 software maintains a shadow copy of the merged MAC table 30 that can be queried. If no such shadow copy is maintained, the L3 software will query the hardware MAC table for the presence of the pair to be returned and to identify the location "L" within the merged MAC table 30. This data can be used to create the link between the FIB result and the entry in merged MAC table 30. If the entry is not present for some reason in the merged MAC table 30, then the L3 software can insert the entry.

Second, the merged MAC table is used in forwarding operations to determine an egress port 48 for packet 38. This egress port determination may, in general, be made using two different identification mechanisms. In the first identification mechanism, an adjacency pointer 35 produced by the FIB 20 based on the IP destination address (IP_DA) 40 is used as an index to the merged MAC table 30. That is, the adjacency pointer 35 will point to (identify) a specific entry in the merged MAC table 30 for retrieval and use in determining the egress port for packet 38. This first identification mechanism is used when the packet 38 is a routed packet (i.e., when the packet 38 is to be forward between separate and independent subnets that have non-overlapping ranges of IP addresses).

In the second identification mechanism, the merged MAC table 30 is used as a hash table to determine an association between a VLAN and the destination MAC address (MAC_DA). In other words, a search is conducted in the merged MAC table to locate an entry that contains the VLAN, destination MAC address pair. This entry, when located, will identify the egress port 48. This search operation is represented in FIG. 1 by arrow 46. This second identification mechanism is used when the packet 38 is a bridged or non-routed packet (i.e., the packet is to be forwarded between networks that are all carrying the same ranges of IP addresses).

In certain arrangements, for each packet the merged MAC table 30 is accessed once to search for a source MAC address and once for forwarding. As noted, the forwarding can be either an indexed access using an adjacency pointer (if the packet is a routed packet) or a search for a destination MAC address if the packet is bridged.

A first L2 lookup determines, along with other conditions, if packet 38 needs to be routed. If sufficient bandwidth is available, this L2 lookup may be performed in the merged MAC table 30. Alternatively, this L2 lookup may be performed in another table that contains only router MAC addresses. The lookup may be based on the ingress packet VLAN and MAC_destination address. Each router owns a handful of MAC addresses and the matching table can be significantly smaller than the L2 table that learns MAC addresses for the connected L2 segments. In this description, it is assumed that this first L2 lookup is performed we in a separate, smaller table that includes only router MAC addresses. A routing notification 42 can be provided to selection module 25 for use in determining if the packet 38 is bridged or routed and thus which egress port identification mechanism should be utilized. In general, selection module 25 is a logical entity that may be implemented in hardware and/or software that is configured to determine which identification mechanism should be used to locate the egress port.

Figure 2A:
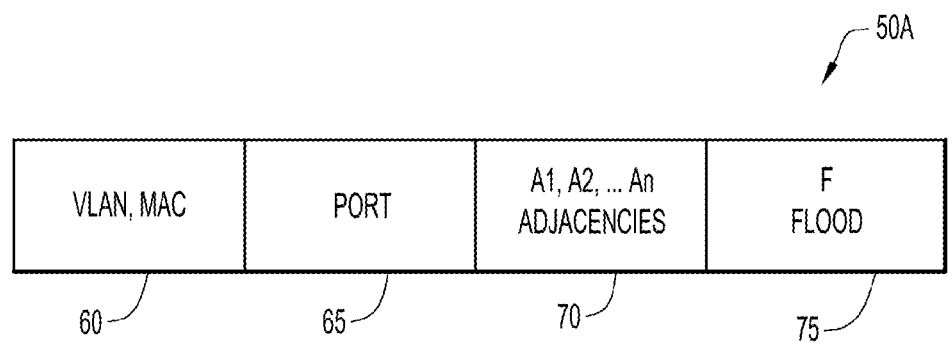
FIG. 2A is a schematic diagram illustrating relevant fields of an entry in a merged media access control (MAC) table in accordance with examples presented herein.

FIG. 2A is a schematic diagram illustrating an example table entry 50A in merged MAC table 30. As shown, merged MAC table entry 50A comprises a VLAN,MAC address field 60, a port field 65, an adjacencies field 70, and a flood field 75.

The VLAN,MAC address field 60 includes a plurality of bits representing a VLAN,MAC address pair as described above. The port field 65 includes one or more bits that identify an egress port corresponding to the VLAN,MAC address pair. The adjacencies field 70 includes one or more bits each associated with an L3 process that may use the entry 50A. The flood field 75 includes one or more bits that are used to determine if packet 38 should be flooded on all egress ports. Further details regarding the use of the adjacencies field 70 and the flood field 75 are provided below.

FIG. 2A illustrates only fields of merged MAC table entry 50A which are relevant to the forwarding operations described below. As such, it is to be appreciated that merged MAC table entry 50A may include additional fields of information.

Figure 2B:
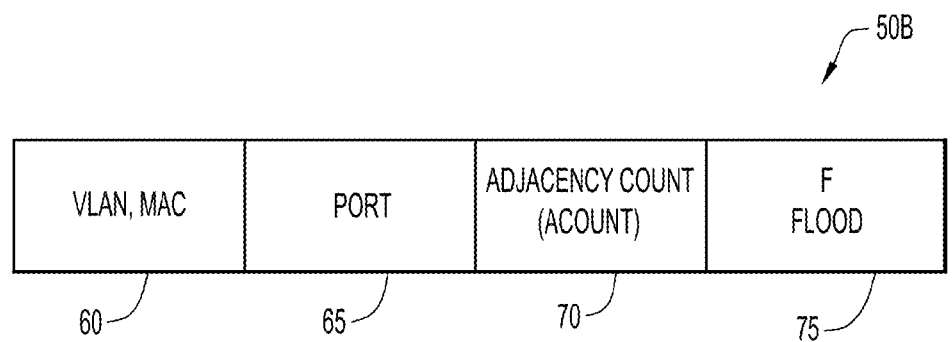
FIG. 2B is a schematic diagram illustrating relevant fields of an alternative entry in a merged MAC table in accordance with examples presented herein.

FIG. 2B is a schematic diagram illustrating an alternative table entry 50B in merged MAC table 30. As shown, merged MAC table entry 50B includes a VLAN,MAC address field 60, a port field 65, and a flood field 75, and other non-relevant fields (not shown in FIG. 2B) as described above with reference to FIG. 2A. Packet 50B also includes an adjacencies field that, in this example, is an adjacency count field 80. In contrast to FIG. 2A, adjacency count field 80 does not include one or more bits each associated with an L3 process. Rather, in this example, the adjacency count field 80 includes one or more bits that form an adjacency reference count. Further details regarding the use of the adjacency count field 80 and the flood field 75 are provided below.

Figure 3:
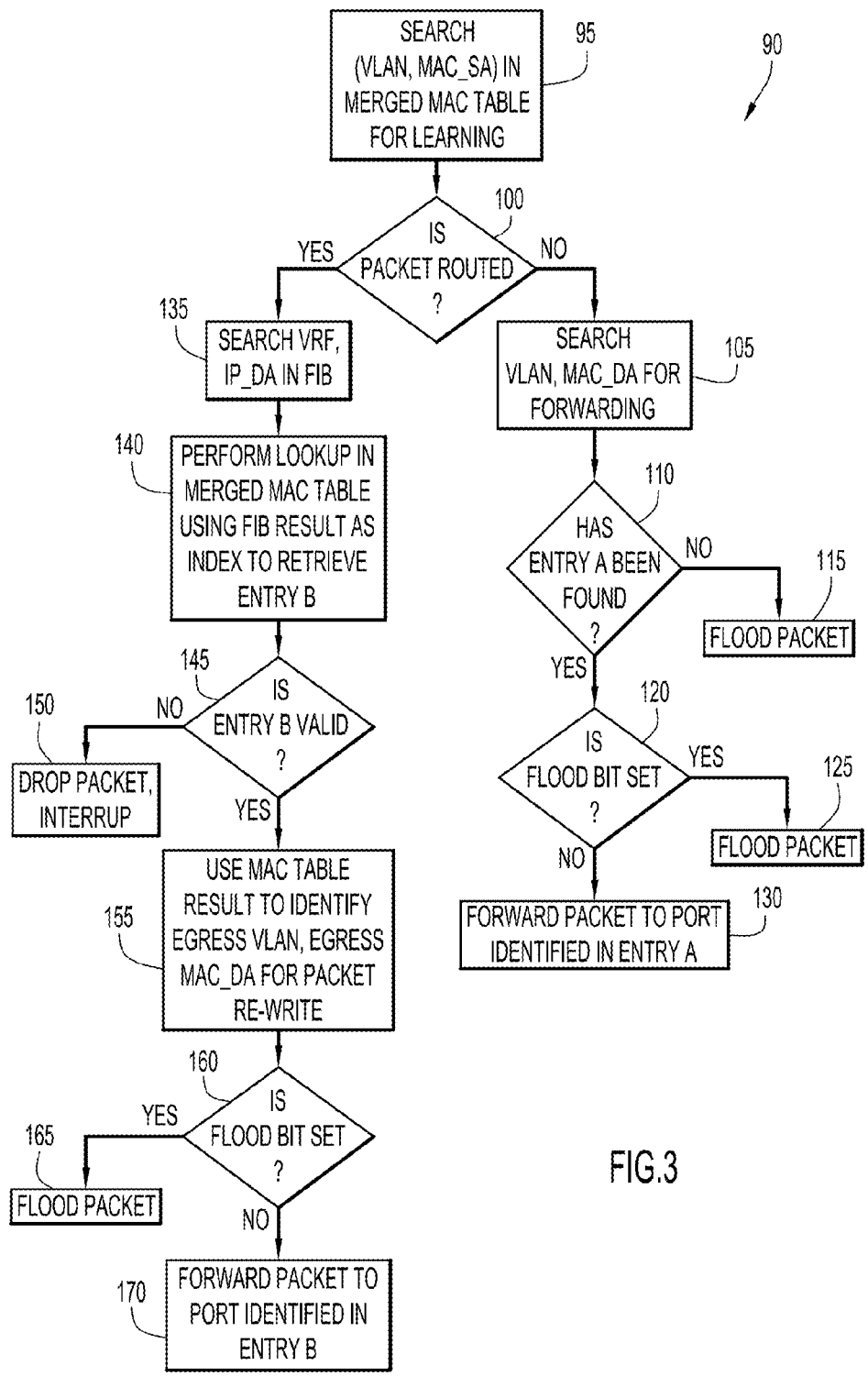
FIG. 3 is a flowchart illustrating forwarding operations in accordance with examples presented herein.
Figure 4:
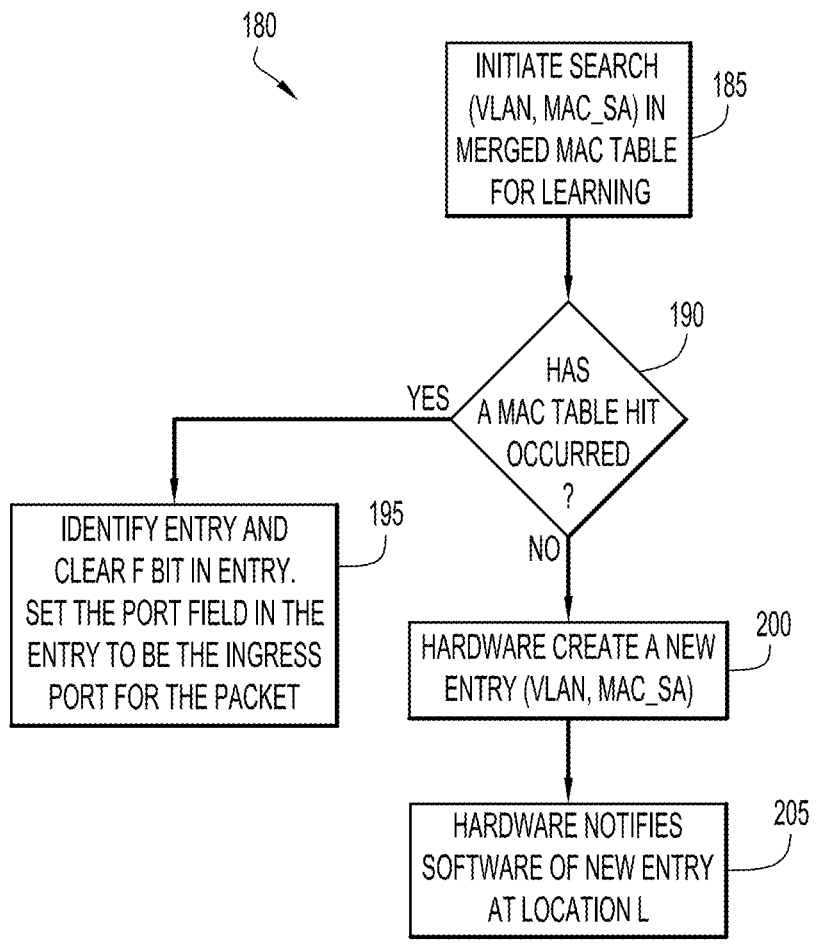
FIG. 4 is a flowchart illustrating search operations in accordance with examples presented herein.

Reference is now made to FIG. 3. FIG. 3 is a detailed flowchart illustrating a method 90 for forwarding a received packet from an ingress port to an egress port. For ease of reference, the example of FIG. 3 will be described with reference to the high level network device diagram of FIG. 1. Method 90 begins at 95 where the merged MAC table 30 is used to learn the association of a VLAN and the source MAC address (MAC_SA) for received packet 38.

At 100, a determination is made as to whether the packet 38 is to be routed (i.e., is the packet a routed packet). If packet 38 is not a routed packet, then at 105 a search is conducted in the merged MAC table 30 to determine an association between a VLAN and the destination MAC address (MAC_DA). In other words, a search is conducted to locate an entry (entry A) that contains the VLAN,destination MAC address pair for packet 38.

At 110, a determination is made to whether the entry A has been found. In certain examples, the entry A may have a format as shown above in FIG. 2A or FIG. 2B. This determination may be made, for example, after a period of time sufficient to complete the search. If the entry A has not been found, then at 115 the packet is flooded on all egress ports that are part of the specific VLAN spanning tree. (i.e., all ports of an associated VLAN spanning tree other than the ingress port where the packet was received).

If it is determined at 110 that the entry A has been found, then at 120 a determination is made as to whether the flood bit of the entry is set. If the flood bit is set, then the packet 38 is flooded on all egress ports that are part of the specific VLAN spanning tree If the flood bit is not set, then at 130 the packet 38 is forwarded to the egress port identified in entry A.

Returning to 100, if it is determined that the packet 38 is routed, then at 135 a search is conducted in FIB 20 to determine an adjacency pointer. The search in the FIB is conducted using the destination IP address of packet 38. Next, at 140, a lookup is performed in the merged MAC table 30 using the adjacency pointer 35 to retrieve a specific entry (entry B) in the merged MAC 30. That is, the adjacency pointer 35 is an index value that points to the specific entry B, thereby enabling direct access to, and retrieval of, the entry B.

At 145, a determination is made as to whether the entry B is valid. If not, then at 150 the packet 38 is dropped to trigger an interrupt. If it is determined that the entry B is valid, then at 155 entry B is used to identify the egress VLAN and egress destination MAC address for packet re-write. At 160, a determination is made as to whether the flood bit in entry B is set. If the flood bit is set, then packet 38 is flooded on all egress ports. If the flood bit is not set, then at 170 the packet 38 is forwarded to the egress port identified in entry B.

Figure 5:
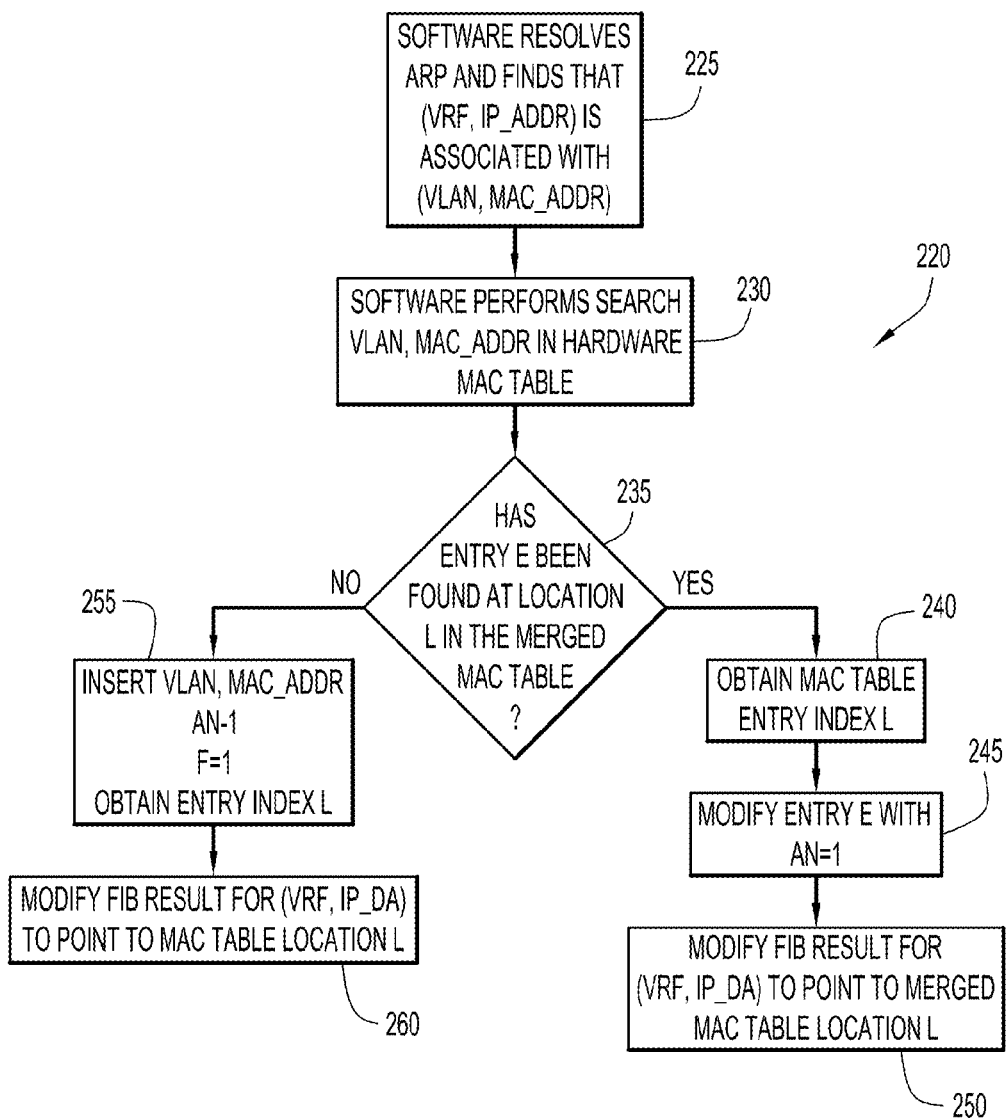
FIG. 5 is a flowchart illustrating operations to resolve forwarding information in accordance with examples presented herein.

Turning now to FIG. 5, a flowchart is shown of a method 180 for conducting the search in the merged MAC table 30 for learning the VLAN,source MAC address pair for packet 38. Method 180 begins at 185 where the VLAN,source MAC address search is initiated in the merged MAC table 30. At 190, a determination is made as to whether a corresponding entry has been located (i.e., whether a MAC table hit has occurred). This determination may be made, for example, after a period of time sufficient to complete the search. If an entry has been found, then at 195 the entry is identified, the flood bit is cleared, and the port field in the entry is set to the ingress port of the packet 38. The adjacencies field is not modified.

Returning to 190, if an entry is not located, then at 200 a new entry for the VLAN,source MAC address pair is created using hardware resources. In this new entry, the flood bit is set to zero and the adjacencies field is also set to zero. Optionally, at 205 the hardware may notify software elements of the location (location L) of the new entry.

Reference is now made to FIG. 5. FIG. 5 illustrates a flowchart of method 220 to resolve forwarding information in accordance with examples presented herein. FIGS. 2A and 2B are also referred to herein in describing FIG. 5. Method 220 begins at 225 where a L3 software application (application N) uses the Address Resolution Protocol (ARP) to resolve a given Virtual Routing and Forwarding (VRF) IP address to a MAC address.

At 230, the software performs a search for the VLAN, MAC_ADDR pair in the merged MAC table 30. At 235, a determination is made as to whether an entry (Entry E) has been found at location L in the merged MAC table. If the entry E has been located, then at 240 the MAC table entry index L (corresponding to location L) is obtained. At 245, the adjacency field of the entry E is modified to indicate that the software application N is using the entry. In this example, the adjacencies field 70 has the format as shown in FIG. 2A, and the bit for $A_N$ is set to a value of 1. At 250, the FIB result for the destination IP address of packet 38 is modified to point to location L in the merged MAC table 30.

Returning to 235, if it is determined that no entry at location L has been found, then an entry is inserted at location L, with the VLAN,MAC_ADDR pair. The adjacencies field has the format as shown in FIG. 2A and the bit for $A_N$ is set to a value of 1. The flood bit is also set to 1 and an entry index of L is obtained. More specifically, if the search indicates that no entry has been found, then a new entry needs to be inserted. Since the MAC table is a hash table, there are specific location where the entry can be inserted based on the value of the VLAN,MAC address. The insertion can be performed by software that calculates the entry location, or can be performed by hardware upon a software command (e.g., "insert new entry X."). In this example, the hardware will insert the entry in the proper location and return the location L to the software through a feedback mechanism (e.g., a notification such as "entry insertion acknowledged at location L"). At 260, the FIB result for the destination IP address of packet 38 is modified to point to location L in the merged MAC table 30.

Entries in a merged MAC table in accordance with examples presented herein should be evicted or removed from the merged MAC table when the entries become outdated or are unused for a period of time in order in order to make room for new entries. This process of removing entries is referred to as "aging" the entries. For example, if after a point of time the VLAN MAC address is not refreshed (determined based on a timestamp), then the corresponding entry should be aged out and removed from the merged MAC table.

From a L2 perspective, when an entry is aged out and removed from the table, the entry's place can be taken by a new entry for a different VLAN,MAC address pair. Removing an entry is generally not a problem if the MAC table is used in a traditional way. However, an entry that is also used as an adjacency, as is the case in the merged MAC table, cannot be removed using traditional mechanisms because the IP address will be potentially associated with no information or incorrect information. That is, because the merged MAC table is used by both hardware and L3 applications, entries within the table cannot be aged out using conventional aging mechanisms. It is to be appreciated that a table can contain a mix of adjacency and non-adjacency entries. To address aging of an adjacency entry, the entries include an adjacencies field that may have a format as shown in FIG. 2A or FIG. 2B and a flood flag or bit "F" to be stored in the entry. In the example of FIG. 2A, the adjacencies field includes one or more bits or flags "A" (e.g., $A_1, A_2 \ldots A_N$) referred to as adjacency flags for each independent L3 application, and a flood flag to be stored in the entry. In the example of FIG. 2B, the adjacencies field includes one or more bits that correspond to an adjacency reference count (Acount).

Aging an entry can be a hardware operation if the hardware maintains a timestamp per entry. In this case, a specific engine (search engine) can identify older entries and evict them from the table to clear space for new entries. In the method presented herein, if the entry is marked with one of the "A" bits, the entry cannot be removed and the search engine can instead set the flood bit and notify the L3 software that an entry has been turned into a flood (if needed). An alternative solution to address the possibility of multiple L3 processes managing an adjacency is shown in FIG. 2B where the set of privately owned "A" bits is replaced with the adjacency reference count. In this case, each process increments the counter when it should set an adjacency and decrement the counter when the L3 process removes the adjacency. The entry will be removed only when the reference count decrements to zero (0).

Figure 6:
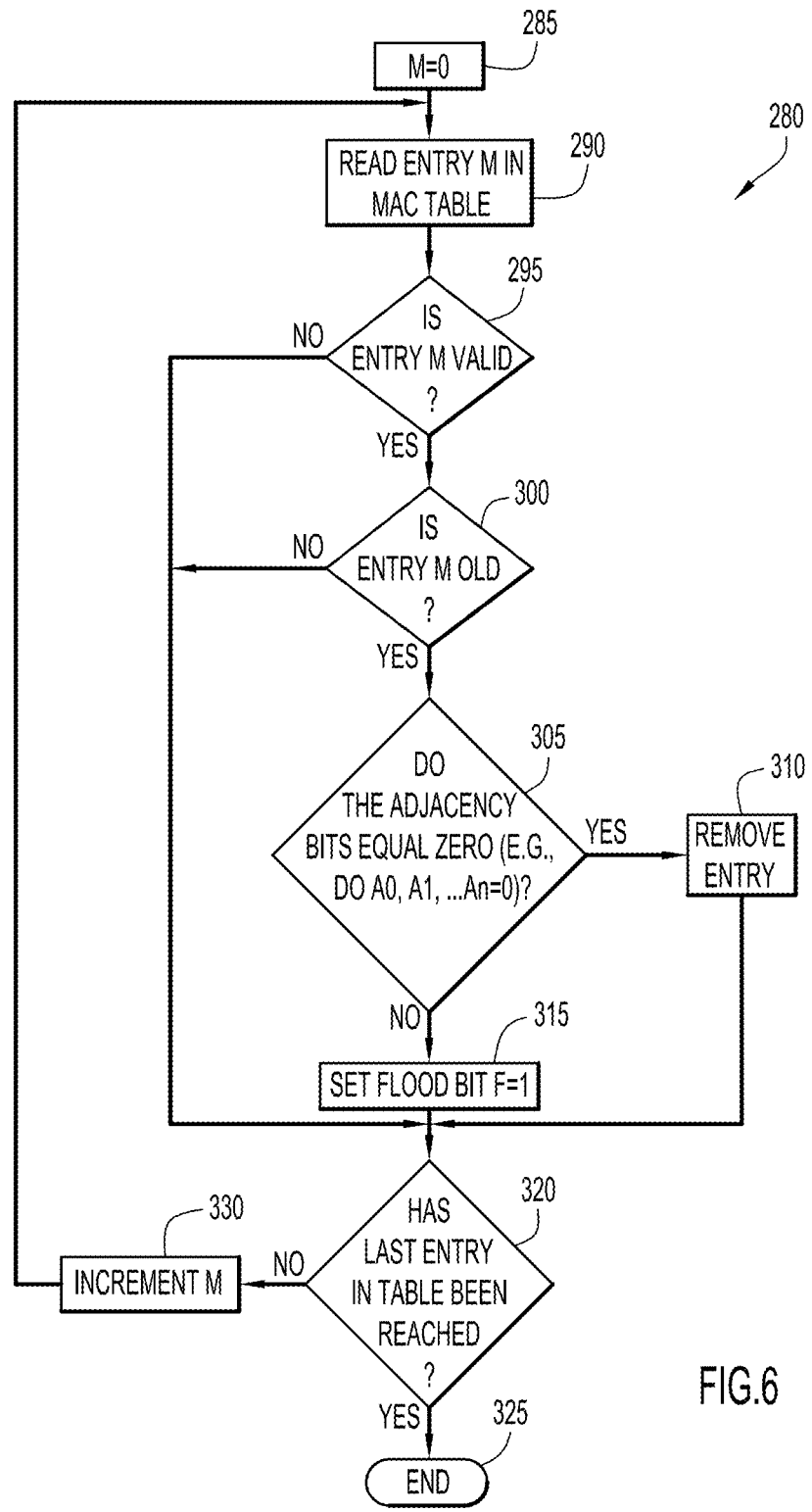
FIG. 6 is a flowchart illustrating hardware aging of an entry from a MAC table in accordance with examples presented herein.

Turning now to FIG. 6, a flowchart is shown of a method 280 for hardware aging an entry of a merged MAC table in accordance with examples presented herein. Method 280 begins at 285 where a reference (M) is set to zero (0). At 290, the entry at location M (e.g., location 0) in the merged MAC table 30 is read. At 295, a determination is made as to whether the entry at location M is valid. If the entry is not valid, the method 280 proceeds to 320.

If the entry at location M is valid, then at 300 a determination is made as to whether the entry is old. This may be determined, for example, by examining a timestamp associated with the entry. In one example implementation, the hardware (e.g., ASIC) maintains a current time that is expressed, for example, in seconds. Upon every refresh (e.g., receiving a packet with a specific, source VLAN, MAC_addresss) the current time is copied into the entry timestamp field. Periodically, the ageing process may remove every entry older then a programmable value (e.g., 400 seconds). An entry is declared old if the difference between the current time and the associated entry timestamp exceeds the programmable value. If the entry at location M is not old, the method proceeds to 320.

If the entry at location M is old, then at 305 a determination is made as to whether the adjacencies field has a value of zero. As noted, the adjacencies field may have different formats that comprise separate bits associated with different L3 applications, or an adjacency count. In either case, if the adjacencies field has a value of zero, then at 310 the entry at location M may be removed from the merged MAC table 30. If the adjacencies field has a value that is not zero, then at 315 the flood bit is set to a value of 1. That is, the flood bit is set to trigger a flood during subsequent operations.

At 320, a determination is made as to whether the last entry in the merged MAC table 30 has been reached. That is, a determination is made as to whether all entries in the table have been evaluated through the above operations. If the last entry has been reached, then the method 280 ends at 325. If the last entry has not been reached, then the reference M is incremented and the operations of 290-320 are repeated.

Figure 7:
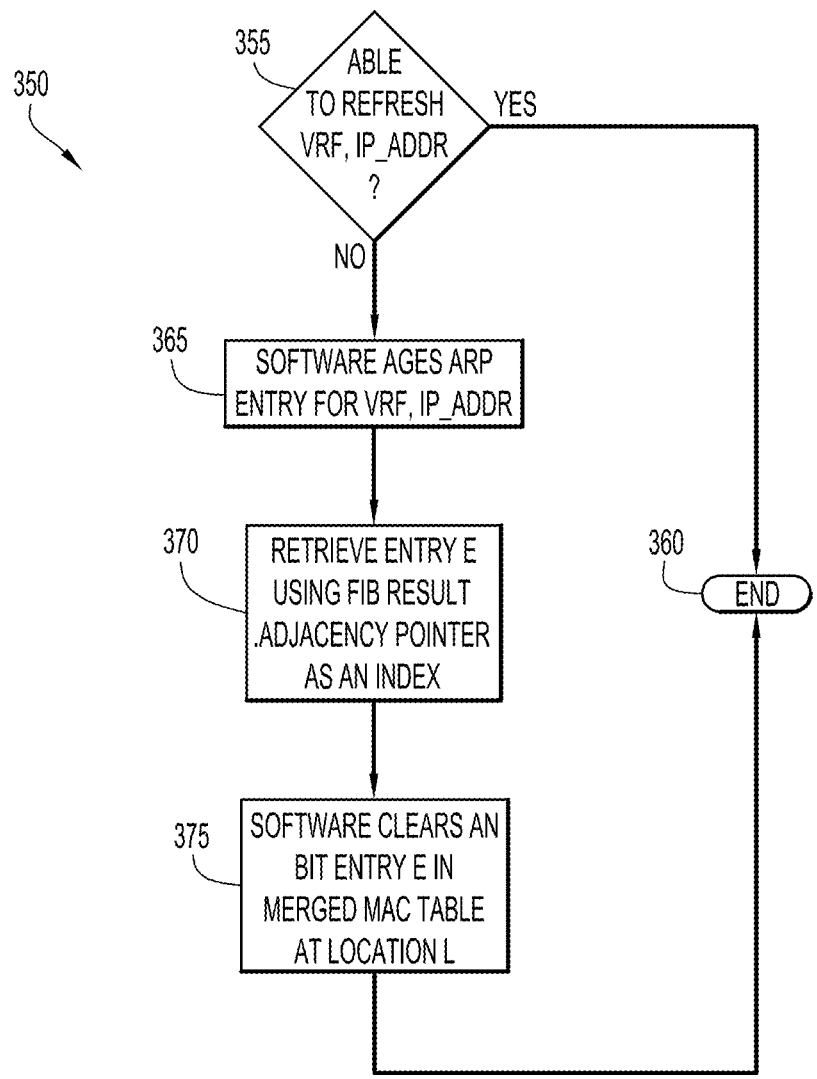
FIG. 7 is a flowchart illustrating software aging of an entry from a MAC table in accordance with examples presented herein.

FIG. 7 is a flowchart of a method 350 for a L3 software application to age an entry in the merged MAC table 30. Method 350 starts at 355 where a determination is made as to whether the VRF, IP_ADDR can be refreshed. If so, the method 350 ends at 360. However, if the VRF, IP_ADDR cannot be refreshed, then at 365 the software application ages an ARP entry for VRF, IP_ADDR. At 370, an adjacency pointer produced as a FIB result is used to retrieve an entry E at location L in the merged MAC table 30. At 375, the software application clears its associated adjacency bits in the entry E (i.e., the bits for $A_n$ are set to zero). The method then ends at 360.

Figure 8:
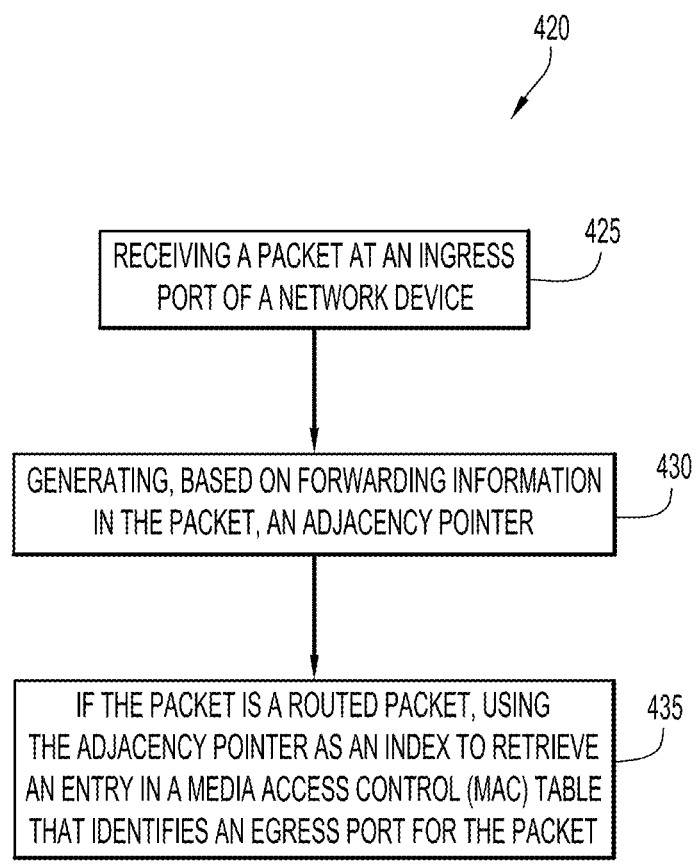
FIG. 8 is a high-level flowchart in accordance with examples presented herein.

FIG. 8 is a high-level flowchart of a method 420 in accordance with examples presented herein. Method 420 begins at 425 where a packet is received at an ingress port of a network device. At 430, based on forwarding information in the packet, an adjacency pointer is generated using a FIB of the network device. At 435, if the packet is a routed packet, then the adjacency pointer is used as an index to retrieve an entry in a MAC table that identifies an egress port for the packet.

Figure 9:
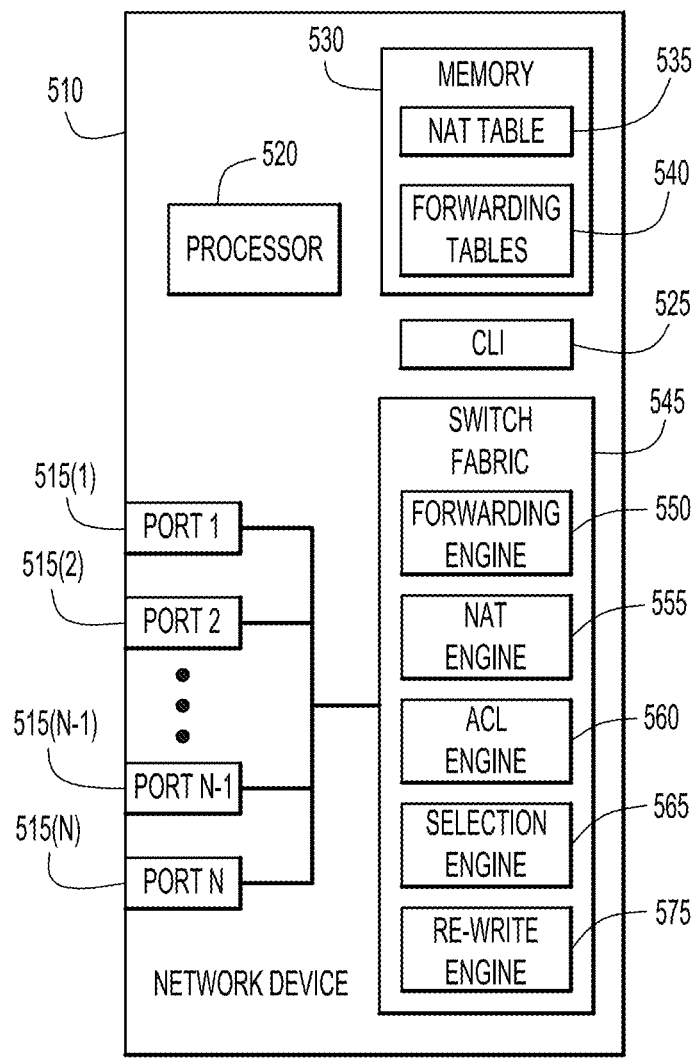
FIG. 9 is a more detailed block diagram of a network device configured to operate in accordance with examples presented herein.

FIG. 9 is a more detailed block diagram of a network device 510 configured to operate in accordance with examples presented herein. Network device 510 may be, for example, a router, a multi-layer switch, etc.

As shown, network device 510 comprises a plurality of ports 515(1)-515(N), a processor 520, a command-line interface (CLI) 525, a memory 530, and a switch fabric 545. The memory 530 comprises, among other elements, a NAT table 535, and forwarding tables 540. Switch fabric 545 comprises, among other elements, a forwarding engine 550, a NAT engine 555, an ACL engine 560, a selection engine 565, a re-write engine 575, etc. The memory 530 may reside within the switch fabric 545.

The memory 530 may comprise read only memory (ROM), random access memory (RAM), magnetic disk storage media devices, optical storage media devices, flash memory devices, electrical, optical, or other physical/tangible memory storage devices. Processor 520 is, for example, a microprocessor or microcontroller. In the example of FIG. 9, the forwarding engine 550, a NAT engine 555, an ACL engine 560, a selection engine 565, a re-write engine 575 are all implemented in hardware (i.e., they are hardware-based elements, such as digital logic gates in one or more application-specific integrated circuits (ASICs)). In other examples, one or more of these elements may be implemented partially or fully in software.

The techniques presented herein remove redundant information in a multilayer switch by merging the adjacency table and the MAC table, thereby providing better scalability and reducing latency. Additionally, the techniques presented herein provision a network device for a single search pass to work on both adjacencies and non-adjacencies to remove the non-adjacencies and mark the adjacencies to be flooded. If a packet with a MAC source address matching the entry is received, a refresh operation will take place and the flood bit will be cleared. The techniques also provision for hardware acceleration of insertion and modification operations. The MAC table engine is able to search an entry based on an L3 software command. If the entry is not present, it can be inserted with either a known port of exit or the flood bit may be set. Hardware is able to modify the entry when an adjacency is created by one L3 process setting the proper "A" bit. Hardware is also able to evict an entry if, when the L3 process clears the owned "A" bit, all the "A" bits are cleared and the flood bit is set (a specific static bit will avoid hardware removal of the entry at all).

The above description is intended by way of example only.

What is claimed is:

1. A method comprising:
   receiving a routed packet at an ingress port of a network device;
   generating, based on forwarding information in the packet, an adjacency pointer, wherein the adjacency pointer is generated by performing a lookup in a forwarding information database of the network device;
   using the adjacency pointer as an index to perform an index search on a media access control (MAC) table in order to retrieve an entry in the MAC table that identifies an egress port for the packet;
   receiving a non-routed packet at the ingress port of the network device; and
   performing a search in the MAC table as a hash table to determine a VLAN,destination MAC address pair for the non-routed packet in order to identify an egress port for the non-routed packet.

2. The method of claim 1, wherein
   performing the lookup in the forwarding information database of the network device comprises performing the lookup with a destination Internet Protocol (IP) address of the packet.

3. The method of claim 1, further comprising:
   accessing the MAC table to learn the association of a VLAN and a source MAC address of the packet.

4. The method of claim 1, wherein using the adjacency pointer as an index to retrieve an entry in the MAC table comprises:
   using the adjacency pointer as an index to retrieve an entry that comprises a VLAN, MAC address field, a port field, an adjacencies field, and a flood field.

5. The method of claim 4, wherein the adjacencies field includes one or more bits that are each associated with a Layer 3 (L3) process.

6. The method of claim 4, wherein the adjacencies field includes one or more bits that form an adjacency count.

7. The method of claim 6, further comprising updating an entry in the MAC table by incrementing or decrementing the adjacency count for the entry, and removing the entry when the adjacency count for the entry reaches a predetermined value.

8. The method of claim 1, further comprising updating an outdated entry in the MAC table by updating a flag for the outdated entry, wherein the flag causes the entry to be searched during the index search on the MAC table and ignored when performing the search in the MAC table as the hash table.

9. An apparatus comprising:
   one or more network interface ports;
   a memory; and
   a processor coupled to the one or more network interface ports and the memory, wherein the processor:
      receives a routed packet at an ingress port of a network device,
      generates, based on forwarding information in the packet, an adjacency pointer, wherein the processor generates the adjacency pointer by performing a lookup in a forwarding information database stored in the memory;
      uses the adjacency pointer as an index to perform an index search on a media access control (MAC) table in order to retrieve an entry in the MAC table that identifies an egress port for the packet;
      receive a non-routed packet at the ingress port; and
      perform a search in the MAC table as a hash table to determine a VLAN,destination MAC address pair for the non-routed packet in order to identify an egress port for the non-routed packet.

10. The apparatus of claim 9, wherein pointer the processor:
    the processor performs the lookup in the forwarding information database of the network device with a destination Internet Protocol (IP) address of the packet.

11. The apparatus of claim 9, wherein the processor:
    accesses the MAC table to learn the association of a VLAN and a source MAC address of the packet.

12. The apparatus of claim 9, wherein to use the adjacency pointer as an index to retrieve an entry in the MAC table, the processor:
    uses the adjacency pointer as an index to retrieve an entry that comprises a VLAN, MAC address field, a port field, an adjacencies field, and a flood field.

13. The apparatus of claim 12, wherein the adjacencies field includes one or more bits that are each associated with a Layer 3 (L3) process.

14. The apparatus of claim 12, wherein the adjacencies field includes one or more bits that form an adjacency count.

15. The apparatus of claim 14, wherein the processor is further configured to update an entry in the MAC table by incrementing or decrementing the adjacency count for the entry, and remove the entry when the adjacency count for the entry reaches a predetermined value.

16. The apparatus of claim 9, wherein the processor is further configured to update an outdated entry in the MAC table by updating a flag for the outdated entry, wherein the flag causes the outdated entry to be searched during the index search on the MAC table and ignored during the search in the MAC table as the hash table.

17. One or more tangible non transitory computer readable storage media encoded with software comprising computer executable instructions and when the software is executed operable to:
    receive a routed packet at an ingress port of a network device;
    generate, based on forwarding information in the packet, an adjacency pointer, wherein the adjacency pointer is generated by performing a lookup in a forwarding information database stored in the memory;
    use the adjacency pointer as an index to perform an index search on a media access control (MAC) table in order to retrieve an entry in the MAC table that identifies an egress port for the packet
    receive a non-routed packet at the ingress port of the network device; and
    perform a search in the MAC table as a hash table to determine a VLAN,destination MAC address pair for the non-routed packet in order to identify an egress port for the non-routed packet.

18. The computer readable storage media of claim 17, wherein the instructions operable to
    perform the lookup in the forwarding information database of the network device by performing the lookup with a destination Internet Protocol (IP) address of the packet.

19. The computer readable storage media of claim 17, further comprising instructions operable to:
    access the MAC table to learn the association of a VLAN and a source MAC address of the packet.

20. The computer readable storage media of claim 17, wherein the instructions operable to use the adjacency pointer as an index to retrieve an entry in the MAC table comprise instructions operable:

use the adjacency pointer as an index to retrieve an entry that comprises a VLAN, MAC address field, a port field, an adjacencies field, and a flood field.

21. The computer readable storage media of claim 20, wherein the adjacencies field includes one or more bits that are each associated with a Layer 3 (L3) process.

22. The computer readable storage media of claim 20, wherein the adjacencies field includes one or more bits that form an adjacency count.

23. The computer readable storage media of claim 22, wherein the instructions are further operable to update an entry in the MAC table by incrementing or decrementing the adjacency count for the entry, and remove the entry when the adjacency count for the entry reaches a predetermined value.

24. The computer readable storage media of claim 17, wherein the instructions are further operable to update an outdated entry in the MAC table by updating a flag for the outdated entry, wherein the flag causes the outdated entry to be searched during the index search on the MAC table and ignored during the search in the MAC table as the hash table.

* * * * *